(No Model.)
S. C. C. CURRIE.
METHOD OF MEASURING AND REGISTERING ELECTRIC ENERGY.
No. 427,749. Patented May 13, 1890.
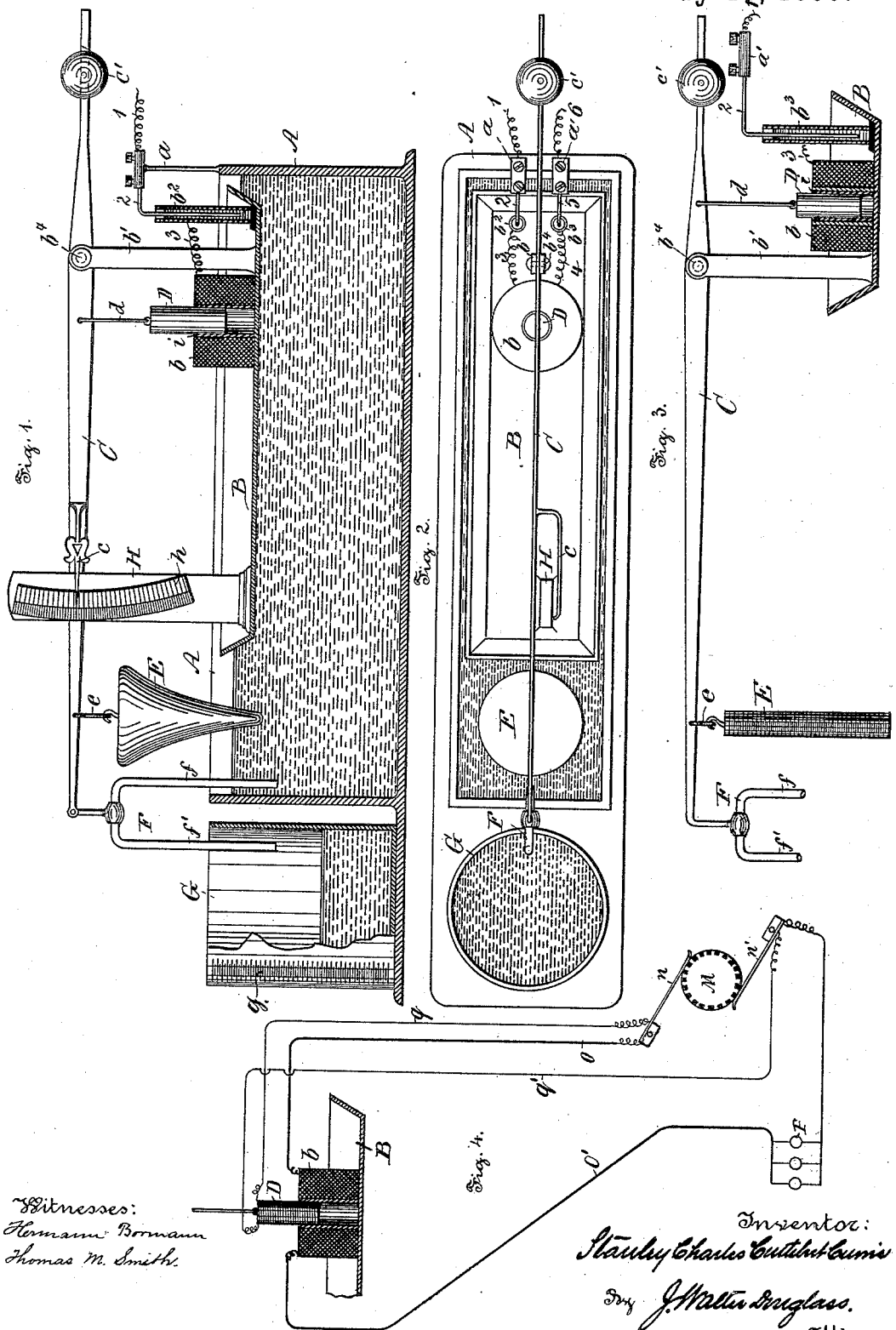
Witnesses:
Hermann Bormann
Thomas M. Smith
Inventor:
Stanley Charles Cutbush Currie
By J. Walter Douglass
Att'y

UNITED STATES PATENT OFFICE.

STANLEY CHARLES CUTHBERT CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

METHOD OF MEASURING AND REGISTERING ELECTRIC ENERGY.

SPECIFICATION forming part of Letters Patent No. 427,749, dated May 13, 1890.

Application filed November 30, 1889. Serial No. 332,159. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in the Method of Measuring and Registering Electric Energy, of which the following is a specification.

My invention relates to a method of ascertaining the quantity or strength of an electric current and accurately measuring and registering electric energy passing through a circuit in a given time.

My invention consists, first, of a method of accurately determining the quantity or strength of an electric current traversing a circuit in a given time by causing said current to vary by its magnetic or other action the quantity of a fluid caused to pass into a vessel.

My invention consists, secondly, of the method of ascertaining the quantity and strength of electricity traversing a circuit in a given time by opposing a varying hydrostatic resistance to the armature of an electro-magnet, and causing said magnet by its attraction to vary hydrostatic pressure upon an orifice through which a fluid passes and registering the quantity of fluid that has passed through said orifice; and my invention consists, thirdly, in the method of ascertaining the quantity and strength of electricity traversing a circuit in a given time, causing the effective pull exerted by an electro-magnet to be directly proportional to the current passing through the magnet by opposing a varying hydrostatic resistance to the armature thereof.

In the accompanying drawings I have shown apparatus susceptible of being used for carrying my method into effect, and in which—

Figure 1 is a longitudinal central section of a meter especially adapted for carrying out my method. Fig. 2 is a top or plan view thereof. Fig. 3 is a view, partly in section and partly in elevation, of a modified form of the apparatus with the lower portions of the meter removed; and Fig. 4 is a view, partly in section and partly in elevation, of a portion of the meter with the electro-magnetic device so arranged that the movement of the plunger of said device is dependent not only upon the current of the main circuit alone, but also upon the electro-motive force of the circuit, whereby may be measured with accuracy the amount of electric energy traversing a circuit in a given time.

Referring to the drawings, A represents a tank provided with two binding-posts $a$ and $a'$. Upon the surface of a liquid or fluid contained in the tank A floats a buoy B. The pan or buoy B sustains at one end thereof a helical coil of wire or a magnet $b$, a bifurcated post or standard $b'$, and two mercury-cups $b^2$ and $b^3$, and at the opposite end a support H, carrying a segmental scale $h$. The oscillating lever C, provided with a pointer or index-finger $c$, is connected with the bifurcated extremity of the post or standard $b'$ by means of a pivot $b^4$. This lever C is provided with an adjustable counter-weight $c'$. The core D of the magnet $b$, Figs. 1, 2, and 3, made of soft iron, is pivotally connected with the oscillating lever C by means of the link $d$ and extends into the space included within the helical coil of wire $b$. A float E is pivoted to a link $e$, which is similarly connected with oscillating lever C and extends into the liquid contained in the tank A. An inverted-U-shaped capillary tube F is pivotally secured to the oscillating lever C, and one of the depending extremities $f$ thereof is submerged a short distance in the liquid contained in the tank A, and the other depending extremity $f'$ of this tube extending outside of the tank A into a vessel G, having a graduated scale $g$ formed on the circumferential surface thereof.

The pan or buoy B is allowed a freedom of vertical movement, but is retained in proper relative position in the tank A by means of wires immersed in mercury-cups $b^2$ and $b^3$ in any preferred manner.

1 is a wire or other conductor connected with one of the binding-posts $a$ and leading from a source of electric energy. 2 is a wire or conductor connected with said binding-post $a$ and dipping into the mercury-cup $b^2$. 3 is a wire or other conductor leading from said mercury-cup $b^2$ to the helical coil of wire $b$.

4 is a wire or other conductor leading from the helical coil of wire $b$ to the mercury-cup $b^3$.

5 is a conductor dipping into the mercury-cup $b^3$ and leading to the other binding-post $a'$, and 6 is a conductor connected with the binding-post $a'$ and completing the generator-circuit.

The coil of wire $b$ may be wound in the form of a helix around the hollow core or cylinder of diamagnetic substance or brass $i$, as shown in Fig. 1, or around a hollow core or cylinder of soft iron lined with a diamagnetic substance or brass, as shown in Fig. 3.

My method may be carried out by means of said meter in the following manner: The tank A and the tube F are filled with a liquid—such as acidulated water—and the oscillating lever C so adjusted by means of the counter-weight $c'$ as that the end $f$ of the tube F will extend a short distance—say one-eighth of an inch, more or less—beneath the surface of the liquid in the tank A, in which position the acidulated water will not be siphoned from the tank A into the vessel G. The meter having been included in circuit by means of the wires or conductors 1 and 6, the vessel G is placed in position alongside or adjacent to the tank A, and with the tube F, previously filled with a fluid or liquid by suction or otherwise, placed in position with the end $f'$ thereof extending into the vessel G. Preference is given to a tube with a very fine bore, because the fluid or liquid will remain in the tube even when raised entirely above the surface thereof, and, moreover, when one end of the tube is immersed a short distance—say a quarter of an inch, more or less—into the liquid or fluid the same will not flow at the opposite end—that is, of course, assuming that the two depending portions of the tube are of equal length. This is due to the fact that the pressure or head is not sufficient to overcome the capillary attraction, and hence for the first readings from the zero-point commences from a point slightly below the surface of the liquid. This is of considerable importance, for the reason that the tube need never be raised entirely out of the liquid or fluid, and consequently never emptied. It will thus be seen that according to the amount of current passing through the helix $b$ will the plunger D, and consequently the tube F, be proportionally lowered, and thereby the amount of the fluid which will flow in a given time from the tank A through the tube F into the vessel G will be dependent upon the current through said coil $b$. At the same time the rate or strength of the current flowing at any moment may be observed by the pointer $c$ on the dial $h$.

The attraction on an iron core by a solenoid will not alone cause the various depths of immersion of the tube F, so as to cause the flow of the liquid through said tube F, consequent upon the variations in the "head," to give absolute proportions, and hence in order to obtain the desired absolute proportional results a displacement-float E is suspended from the movable lever C at any preferred point. The shape of said float is such that the resistance exerted against the downward movement of the lever by its displacement of the liquid is so proportioned at the various depths that the immersion of the tube F, and consequently the flow of the liquid therethrough, is exactly proportional to the amount of current passing through the coil in a given time. This float E may be caused to assume, among other forms, that of a cylinder, as in Fig. 3, or that of a cone or pyramid, as in Fig. 1, or of an inverted cone or pyramid, the former offering a constant resistance and the latter an increasing resistance or a decreasing resistance, as may be desired. The form of said floats will of course be dependent upon the nature of the electro-magnetic devices employed. For example, as in the case of a plain solenoid, with the arrangement of the parts as shown in Figs. 1 and 2, the upper part of the displacement-float will be considerably larger than the lower end, while, on the other hand, if a repelling action is required—such as illustrated in Fig. 3—the force exerted upon the lever-arm C at varying distances is in a decreasing ratio in contradistinction to an increasing one, as in the case of a plain solenoid, and consequently a float will be made use of in this instance in the form of a cone or pyramid, but inverted, as compared with that employed in conjunction with a plain solenoid. Again, when a device is used in which the forces are in direct proportion—such as in an ammeter or voltmeter—a float in the form of a plain cylinder will be employed for insuring the best practical results.

During the operation of the meter the pan or buoy B will sink farther into the tank A; but the contact from the circuit through the coil B is maintained by means of the wires or conductors dipping into the mercury-cups $b^2$ and $b^3$. It will be seen by this arrangement that if by accident or thoughtlessness the water should sink below a certain level the circuit will be automatically broken and the lamps in circuit thereby extinguished.

Fig. 3 represents an arrangement in which the coil $b$ surrounds a hollow soft-iron cylinder fixed to the coil, together with a lining of brass, and within which the soft-iron core D is free to move. In this instance the current passing through the coil will cause said core to be repelled consequent upon the mutual action between itself and the fixed soft-iron hollow cylinder or tube $i$. The above are examples of the many other magnetic or electrical appliances which may be available for actuating said oscillating lever C.

From the position of the index $c$ with reference to the scale $h$, Figs. 1 and 2, and from the position of the float E with reference to the surface of the liquid, Fig. 3, the passage of the current through the meter at any moment of time may be ascertained, and by measuring the quantity of water which has passed by drops from the tank A into the vessel G in a given length of time the quantity of electricity which has traversed the meter in that time may be accurately ascertained. Moreover, instead of measuring the quantity of water in the vessel G, the scale $g$ may be so graduated that the height of the water as indicated thereby will represent the number of units of electricity that have passed through the meter in a given time.

Fig. 4 represents, instead of a solid soft-iron core D, a coil of wire capable of actuating as a plunger and sliding with the larger coil $b$. If the smaller coil be composed of fine wire and of sufficiently high resistance, the combined action of the two coils upon one another will cause the device to register the amount of electric energy passing in a given time. This arrangement is also applicable to alternating currents as well as to direct currents. M is the armature of the dynamo, and $n$ and $n'$ the brushes thereof. O and O' are conductors in contact with said brushes, respectively, and form the generator-circuit. P are the lamps included in said circuit. $q$ and $q'$ are conductors connected with said brushes $n$ and $n'$, and constitute a shunt to the lamp-circuit.

Having thus described the nature and objects of my invention, what I claim as new, and desire to secure by Letters Patent, is—

1. The method of ascertaining the quantity and strength of electricity traversing a circuit in a given time, which consists in opposing a varying hydrostatic resistance to the armature of an electro-magnet and causing said magnet by its attraction to vary hydrostatic pressure upon an orifice through which a fluid passes and registering the quantity of fluid that has passed through said orifice, substantially as described.

2. In the method of ascertaining the quantity and strength of electricity traversing a circuit in a given time, causing the effective pull exerted by an electro-magnet to be directly proportional to the current passing through the magnet by opposing a varying hydrostatic resistance to the armature thereof, substantially as described.

In witness whereof I have hereunto set my signature in the presence of two subscribing witnesses.

STANLEY CHARLES CUTHBERT CURRIE.

Witnesses:
GEO. W. REED,
THOMAS M. SMITH.